Sept. 18, 1923.
J. C. COULOMBE
1,468,282
AIR COMPRESSING MEANS
Filed Jan. 5, 1918
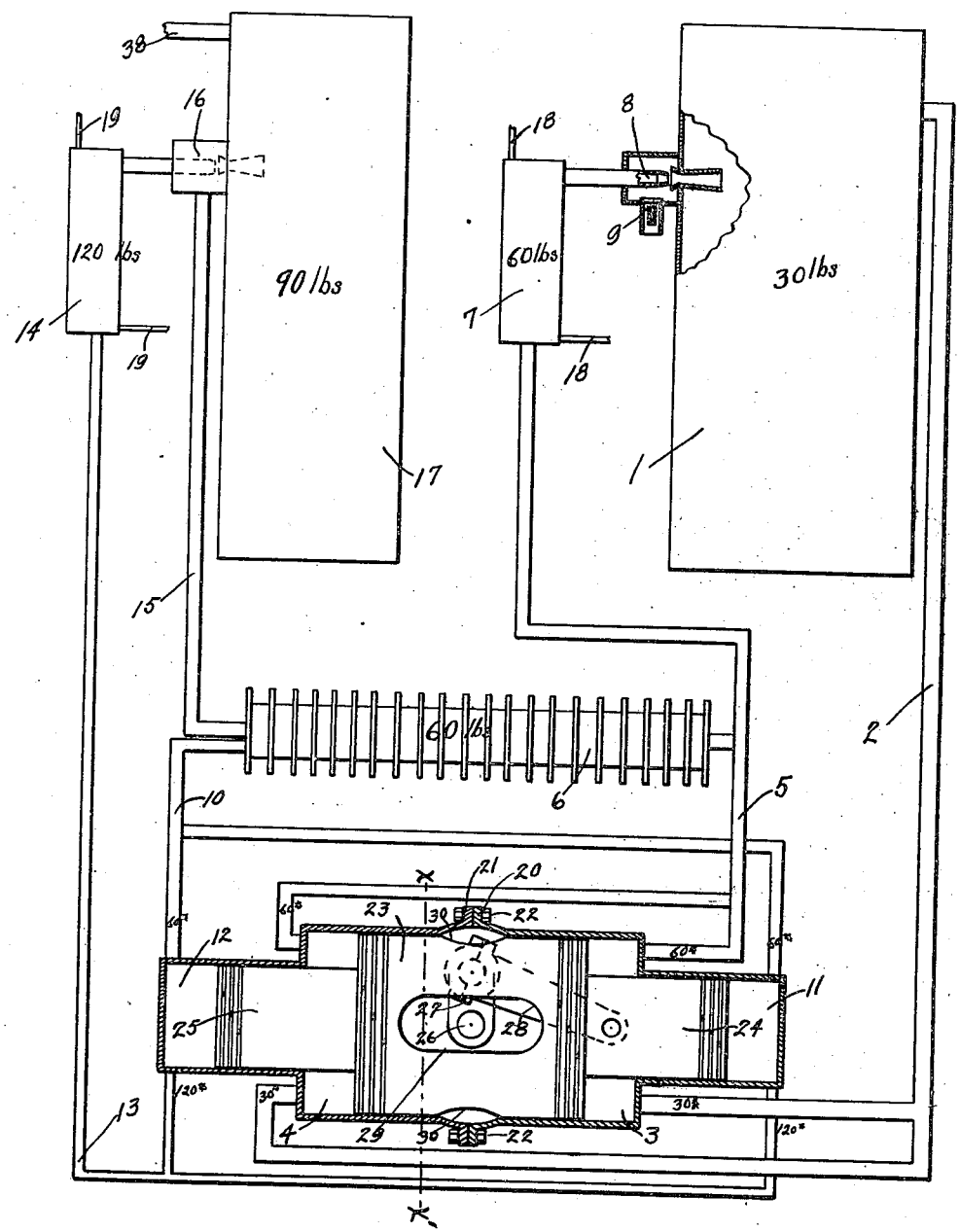
INVENTOR
J. R. Coulombe Patented Sept. 18, 1923.

1,468,282

UNITED STATES PATENT OFFICE.

JOSEPH C. COULOMBE, OF DRACUT, MASSACHUSETTS.

AIR-COMPRESSING MEANS.

Application filed January 5, 1918. Serial No. 210,504.

*To all whom it may concern:*

Be it known that I, JOSEPH C. COULOMBE, a citizen of the United States, residing at Dracut, in the county of Middlesex and State of Massachusetts, have invented certain new and useful Improvements in Air-Compressing Means, of which the following is a specification.

My invention relates to improvements in air compressors and air injecting means; and the objects of my improvements are, first, to provide a simple and compact air pump; second, to provide means of utilizing air injection in conjunction with an air pump to produce air pressure economically.

I attain these objects by the mechanism illustrated in the accompanying drawing.

It is a well known fact that the greatest heat loss in compressing air occurs at the lower air pressure stage. That is, in compressing air to say 90 pounds pressure, as much power is required to compress the first 30 pounds pressure as is required to compress the remaining 60 pounds pressure, approximately. It is also a well known fact that air can be induced into a tank under pressure by a stream of air under pressure passing through a nozzle, similar to steam boiler injectors.

What I propose to do is to connect the intake valve of an air compressor to an air tank containing compressed air, compressing this air to a still higher pressure and passing this higher pressure through a nozzle, inducing atmospheric air with it and discharging into the said air tank.

I go a step further in this process to secure further economy, and provide a method of pre-heating this higher compressed air after it leaves the compressor and before it passes through the nozzle, to increase the volume.

Any number of compounding combinations can be arranged, but preferably use the combination of compounding shown and hereinafter described.

The single figure is a diagrammatic representation of my invention.

1 is an air tank maintained at a comparatively low pressure, say 30 pounds; which delivers its air through pipe line 2 to the intake of low compression cylinders 3 and 4; a pipe line 5 connects the exhaust of cylinders 3 and 4 with intercooler 6 and preheater 7; 8 is the injector nozzle of tank 1; 9 is a check valve through which the atmospheric air is supplied to injector nozzle 8; a pipe line 10 connects intercooler 6 with the intake of high pressure cylinders 11 and 12; a pipe line 13 connects the exhaust of high pressure cylinders 11 and 12 with preheater 14; pipe line 15 connects intercooler 6 with injector nozzle 16 of tank 17, which is maintained at a working pressure of say 90 pounds; 38 is the outlet pipe line of tank 17.

Preheaters 7 and 14 are supplied with steam for heating by pipe lines 18 and 19, respectively.

The low pressure cylinders 3 and 4 terminate in flanges 20 and 21 which are bolted together by bolts 22. A hollow duplex-compound piston is used, in which the large central part 23 operates in cylinders 3 and 4, its smaller ends 24 and 25 operating in cylinders 11 and 12. The said piston is operated by drive-shaft 26, crank 27 and connecting rod 28. The large portion 23 of the piston is provided with diametrically opposed clearance slots 29 to clear drive shaft 26, and diametrically opposed slots 30 to allow oscillations of connecting rod 28 during the reciprocal movement of the piston.

This construction has several advantages. First, the crank-case is eliminated, as the large portion of the piston serves that purpose. Second, one crank and one connecting rod taking the place of four. Third, one piston taking the place of four and giving at least three times as much longitudinal bearing.

I have shown a duplex-compound compressor as that shows more clearly to what extent this construction can be carried out, but it is evident that the construction is equally applicable to a plain duplex or double acting compressor; a simple compound compressor, as would be if the drawing were cut off at line XX'; or as a plain simple compressor without the compound or double-acting feature.

The operation is as follows: In starting the mechanism, there being no air pressure in tanks 1 and 17, air at atmospheric pressure is drawn into cylinders 3 and 4 from pipe line 2, tank 1 and check valve 9, compressing this air and discharging it into tank 1 through pipe line 5 and nozzle 8 until tank 1 has attained required pressure, say 30 pounds. Then the continuous operation follows. Cylinders 3 and 4 thereafter intake air at 30 pounds pressure and discharge it, at say 60 pounds, to pipe line 5; part of this air going to intercooler 6 and part to preheater 7, continuing on through nozzle 8, inducing atmospheric air through check valve 9 and forcing it into tank 1. Part of this air in intercooler 6 goes through pipe line 10 and into intake of cylinders 11 and 12, where it is compressed, to say 120 pounds, and exhausted through pipe line 13, into preheater 14, through nozzle 16, inducing air from intercooler 6 through pipe line 15, and into tank 17, at say 90 pounds. From tank 17 this air is led to do work through pipe line 38.

What I claim as new and desire to secure by Letters Patent is:

In air compressing means, the combination of a pump; a reservoir; connection between said reservoir and the intake of said pump; connection between the exhaust of said pump and said reservoir; an air injector in said exhaust connection; and means for heating the air of said exhaust connection before it enters said injector.

JOSEPH C. COULOMBE.

Witnesses:
B. D. COULOMBE,
WILFRED HEBERT.